3,506,663
PROCESS FOR THE PREPARATION OF 4-ARYL-2-QUINAZOLINEPROPIONITRILES AND INTERMEDIATES UTILIZED THEREIN
Stanley C. Bell, Penn Valley, Pa., assignor to American Home Products Corporation, New York, N.Y., a corporation of Delaware
No Drawing. Filed Feb. 12, 1968, Ser. No. 704,583
Int. Cl. C07d 51/48
U.S. Cl. 260—251                         10 Claims

ABSTRACT OF THE DISCLOSURE

This invention concerns a process to prepare 4-aryl-2-quinazolinepropionitriles by the cyclization of 4-aryl-1,2-dihydro-2-quinazolinepropionitriles 3-oxides to afford 5-ary-1-imino-1,2,3,3a - tetrahydropyrrolo(1,2 - a)quinazoline 4-oxides which are then subjected to a rearrangement reaction. Further, this invention relates to 5-aryl-1-imino-1,2,3,3a-tetrahydro(1,2-a)quinazoline 4-oxides which are useful intermediates in the preparation of pharmacologically active 4-aryl-2-quinazolinepropionitriles.

---

The present invention is concerned with new and novel 5-aryl - 1 - imino-1,2,3,3a-tetrahydro(1,2-a)quinazoline 4-oxides intermediates which are employed in the new and novel process herein described to prepare 4-aryl-2-quinazolinepropionitriles which in standard and accepted pharmacological tests have demonstrated activity as central nervous system depressants.

The new and novel compounds of the present invention are exemplified by the following structural formula:

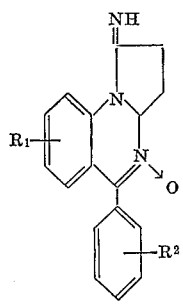

wherein $R_1$ and $R_2$ are both selected from the group consisting of hydrogen, halogen, lower alkyl and lower alkoxy. As employed herein the terms "lower alkyl" and "lower alkoxy" are meant to include both branched and straight chain moieties having from one to about eight carbon atoms. Typical examples of these compounds are: 7-chloro - 1 - imino-5-phenyl-1,2,3,3a-tetrahydropyrrolo-(1,2 - a)quinazoline 4-oxide; 1-imino-7-methyl-5-phenyl-1,2,3,3a - tetrahydropyrrolo(1,2 - a)quinazoline 4-oxide; 1-imino - 5 - phenyl-1,2,3,3a-tetrahydropyrrolo(1,2-a) quinazoline 4-oxide; 5-(p-chlorophenyl)-1-imino-7-methoxy - 1,2,3,3a - tetrahydropyrrolo(1,2-a)quinazoline 4-oxide and 7 - chloro-1-imino-5-(p-tolyl)-1,2,3,3a-tetrahydropyrrolo(1,2-a)quinazoline 4-oxide.

The new and novel process of the present invention for the preparation of these pharmacologically efficacious 4-aryl-2-quinazolinepropionitriles is depicted by the following reaction sequence:

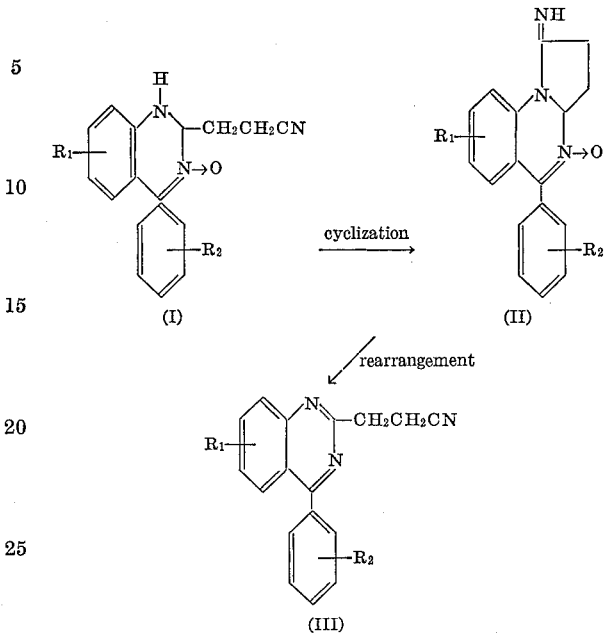

wherein $R_1$ and $R_2$ are defined as above. The cyclization reaction is effected by contacting and stirring an appropriate 4-aryl-1,2-dihydro-2-quinazolinepropionitrile 3-oxide (I) with an alkali metal hydroxide in a water miscible, reaction-inert organic solvent for a period from about twelve to about seventy-two hours. Preferably this reaction is conducted in ethanol with sodium hydroxide or potassium hydroxide.

When the cyclization reaction is complete, the resulting 5-aryl - 1 - imino-1,2,3,3a-tetrahydro(1,2-a)quinazoline 4-oxide (II) intermediate may be separated by standard recovery procedures, e.g. aqueous dilution of the reaction mixture, filtration, acidification of the filtrate to about pH 5 and recrystallization of the resulting precipitate from an appropriate solvent, e.g. an alkanol, acetonitrile, benzene and the like.

The rearrangement reaction of an above prepared 5-aryl-1-imino - 1,2,3,3a - tetrahydro(1,2-a)quinazoline 4-oxide (II) is effected by contact with a carboxylic acid anhydride or a mixture of a carboxylic acid anhydride and a carboxylic acid at a temperature range from about 50° C. to about 120° C. for a period of about five to about thirty minutes. Preferably this reaction is conducted with acetic anhydride at about steam bath temperatures for about ten minutes.

When the rearrangement reaction is complete, the resulting 4-aryl-2-quinazolinepropionitrile (III) is separated by conventional methods, e.g. the reaction mixture is concentrated and the residue recrystallized from a suitable solvent, e.g. an alkanol. As employed herein the term "water miscible, reaction-inert organic solvent" is meant to include those water mixable organic solvents which will dissolve the reactants without interfering with their interaction, such as, alkanols, tetrahydrofuran, dimethoxyethane and the like. Other such solvents will readily suggest themselves to those skilled in the art or organic chemistry.

The 5-aryl-1-imino-1,2,3,3a-tetrahydro(1,2-a)quinazoline 4-oxides (II) of the present invention may be hydrolyzed to afford their corresponding 5-aryl-3,3a-dihydropyrrolo[1,2-a]quinazolin-1(2H)-one 4-oxides (IV) as illustrated in the following reaction scheme:

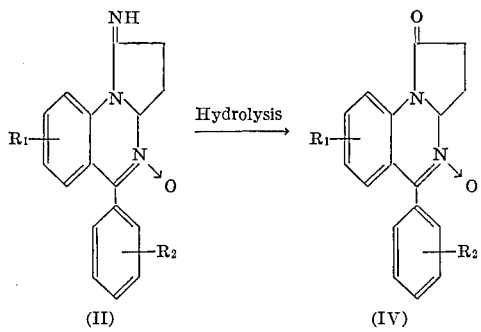

wherein $R_1$ and $R_2$ are defined as above. The hydrolysis is effected by contacting an appropriate 5-aryl-1-imino-1,2,3,3a-tethydro(1,2-a)quinazoline 4-oxide (II) with a mineral acid, e.g. hydrochloric acid for a period of about 5 hours at elevated temperatures. When the acidic hydrolysis is complete, the resulting 5-aryl-2,3a-dihydropyrrolo[1,2-a]quinazolin-1(2H)-one 4-oxide (IV) is separated by standard procedures, e.g. the reaction mixture is filtered and the collected precipitate recrystallized from an appropriate solvent, e.g. an alkanol.

The 4-aryl-1,2-dihydro-2-quinazolinepropionitrile 3-oxide (I) starting materials employed in the novel process of the present invention are prepared by the procedures described in copending United States patent application Ser. No. 704,584, by Stanley C. Bell and entitled, "4-Aryl-1,2-Dihydro-2-Quinazolinepropionitriles 3-Oxides and Related Compounds," and filed on the same day as this application in the United States Patent Office. Therein an appropriate 2-aminobenzophenone oxime is reacted with 3-cyanopropionaldehyde to afford the corresponding 4-aryl-1,2-dihydro-2-quinazolinepropionitrile 3-oxide (I).

The new and novel 5-aryl-1-imino-1,2,3,3a-tetrahydropyrrolo(1,2-a)quinazoline 4-oxides herein described are employed as intermediates in the new and novel process of the present invention to prepare 4-aryl-2-quinazolinepropionitriles (III) which are also described and claimed in the abovementioned copending United States patent, Ser. No. 754,584, by Stanley C. Bell. As described therein the 4-aryl-2-quinazolinepropionitriles (III) in standard pharmacological tests have demonstrated central nervous system depressant activity which renders them useful as anticonvulsants.

The following examples are given by way of illustration and are not to be construed as limitations of this invention, many variations of which are possible without departing from the scope and spirit thereof.

EXAMPLE I

A mixture of 15.0 g. of 6-chloro-1,2-dihydro-4-phenyl-2-quinazolinepropionitrile 3-oxide, 300 ml. of 90% ethanol and 22 ml. of 4 N sodium hydroxide is stirred for seventy-two hours, concentrated to a small volume in vacuo, and diluted with 300 ml. of water. Acidification of the filtrate with acetic acid to pH 5 and recrystallization of the precipitate from isopropanol gives 6.8 g. of 7-chloro-1-imino-5-phenyl-1,2,3,3a-tetrahydropyrrolo(1,2-a)quinazoline 4-oxide, M.P. 162–164° C.

Analysis.—Calcd for $C_{17}H_{14}ClN_3O$ (percent): C, 65.49; H, 4.52; Cl, 11.37; N, 13.48. Found (percent): C, 65.71; H, 4.44; Cl, 11.29; N, 13.82.

A mixture of 1.0 g. of the above prepared 7-chloro-1-imino-5-phenyl-1,2,3,3a-tetrahydropyrrolo(1,2-a)quinazoline 4-oxide and 15 ml. of acetic anhydride is heated on the steam bath for ten minutes. The dark solution is concentrated to dryness in vacuo and the residue recrystallized from ethanol to give 0.5 g. of 6-chloro-4-phenyl-2-quinazolinepropionitrile, M.P. 134–135° C. which is again recrystallized to raise the melting point to 137–138° C.

Analysis.—Calcd. for $C_{17}H_{12}ClN_3$ (percent): C, 69.51; H, 4.12; Cl, 12.07; N, 14.31. Found (percent): C, 70.26; H, 3.90; Cl, 12.07; N, 14.58.

In a similar manner, 7-bromo 1,2-dihydro-4-phenyl-2-quinazolinepropionitrile 3-oxide is cyclized to yield 8-bromo-1-imino-5-phenyl-1,2,3,3a-tetrahydropyrrolo(1,2-a)quinazoline 4-oxide which is rearranged to afford 7-bromo-4-phenyl-2-quinazolinepropionitrile.

EXAMPLE II

A mixture of 7.5 g. of 1,2-dihydro-6-methyl-4-phenyl-2-quinazolinepropionitrile 3-oxide, 150 ml. of methanol and 11 ml. of 4 N potassium hydroxide is stirred for twelve hours, concentrated to a small volume in vacuo, and diluted with 150 ml. of water. Acidification of the filtrate with hydrochloric acid to pH 5 and recrystallization of the precipitate from acetonitrile affords 1-imino-7-methyl-5-phenyl-1,2,3,3a-tetrahydropyrrolo(1,2-a)quinazoline 4-oxide.

A mixture of 0.5 g. of the above prepared 1-imino-7-methyl-5-phenyl-1,2,3,3a-tetrahydropyrrolo(1,2-a)quinazoline 4-oxide and 7.5 ml. of butyric anhydride is heated at 50° C. for thirty minutes. Thereafter, the reaction mixture is concentrated to dryness under vacuum and the residue recrystallized from ethanol to yield 6-methyl-4-phenyl-2-quinazolinepropionitrile.

Similarly, 5-ethyl-1,2-dihydro-4-(p-methoxyphenyl)-2-quinazolinepropionitrile 3-oxide is cyclized to afford 6-ethyl-1-imino-5-(p-methoxyphenyl)-1,2,3,3a-tetrahydropyrrolo(1,2,-a)quinazoline 4-oxide which is rearranged to yield 5-ethyl-4-(p-methoxyphenyl)-2-quinazolinepropionitrile.

EXAMPLE III

A mixture of 30.0 g. of 1,2-dihydro-4-phenyl-2-quinazolinepropionitrile 3-oxide, 600 ml. of tetrahydrofuran and 22 ml. of 8 N sodium hydroxide is stirred for twenty-four hours, concentrated to a small volume in vacuo, and diluted with 600 ml. of water. Acidification of the filtrate with hydrochloric acid to pH 5 and recrystallization of the precipitate from benzene affords 1-imino-5-phenyl-1,2,3,3a-tetrahydropyrrolo(1,2,-a)quinazoline 4-oxide.

A mixture of 2.0 g. of the above prepared 1-imino-5-phenyl-1,2,3,3a-tetrahydropyrrolo(1,2-a)quinazoline 4-oxide and 15 ml. of an acetic acid-acetic anhydride mixture is heated at 120° C. for five minutes. Thereafter, the reaction mixture is concentrated to dryness under vacuum and the residue recrystallized from methanol to yield 4-phenyl-2-quinazolinepropionitrile.

EXAMPLE IV

A mixture of 15.0 g. of 4-(p-chlorophenyl)-6-methoxy-1,2-dihydro-2-quinazolinepropionitrile 3-oxide, 300 ml. of dimethoxyethane and 45 ml. of 2 N potassium hydroxide is stirred for forty-eight hours, concentrated to a small volume in vacuo, and diluted with 300 ml. of water. Acidification of the filtrate with acetic acid to about pH 5 and recrystallization of the precipitate from ethanol affords 5-(p-chlorophenyl)-1-imino-7-methoxy-1,2,3,3a-tetrahydropyrrolo(1,2,a)quinazoline 4-oxide.

A mixture of 1.0 g. of the above prepared 5-(p-chlorophenyl)-1-imino-7-methoxy-1,2,3,3a,-tetrahydropyrrolo(1,2-a)quinazoline 4-oxide and 15 ml. of propionic anhydride is heated at steam bath temperature for twenty minutes. Thereafter, the reaction mixture is concentrated to dryness under vacuum and the residue recrystallized from isopropanol to yield 4-(p-chlorophenyl)-6-methoxy-2-quinazolinepropionitrile.

In like manner, 7-fluoro-1,2-dihydro-4-(m-isopropylphenyl)-2-quinazolinepropionitrile 3-oxide is cyclized to produce 8-fluoro-1-imino-5-(m-isopropylphenyl)-1,2,3,3a-tetrahydropyrrolo(1,2-a)quinazoline 4-oxide which is rearranged to obtain 7-fluoro-4-(m-isopropylphenyl)-2-quinazolinepropionitrile.

EXAMPLE V

A mixture of 45 g. of 6-chloro-1,2-dihydro-4-(p-tolyl)-2-quinazolinepropionitrile 3-oxide, one liter of ethanol and 250 ml. of 1 N sodium hydroxide is stirred for thirty hours, concentrated to a small volume in vacuo, and diluted with one liter of water. Acidification of the filtrate with hydrobromic acid to pH 5 and recrystallization of the precipitate from methanol affords 7-chloro-1-imino-5-(p-tolyl)-1,2,3,3a-tetrahydropyrrolo(1,2-a)quinazoline 4-oxide.

A mixture of 3.0 g. of the above prepared 7-chloro-1-imino - 5 - (p-tolyl) - 1,2,3,3a - tetrahydropyrrolo(1,2-a)quinazoline 4-oxide and 45 ml. of acetic anhydride is heated to 75° C. for twenty minutes. Thereafter, the reaction mixture is concentrated to dryness under vacuum and the residue recrystallized from ethanol to yield 6-chloro-4-(p-tolyl)-2-quinazolinepropionitrile.

EXAMPLE VI

Repeating the procedure of Examples I–V an appropriate 4-aryl-1,2-dihydro-2-quinazolinepropionitrile 3-oxide is cyclized to yield the following 5-aryl-1-imino-1,2,3,3a-tetrahydropyrrolo(1,2-a)quinazoline 4-oxide intermediates which are then rearranged to afford the hereinafter listed 4-aryl-2-quinazolinepropionitrile products.

| Intermediates | Products |
| --- | --- |
| 1-imino-9-methyl-5-(p-propoxyphenyl-1,2,3,3a-tetrahydropyrrolo(1,2-a)quinazoline 4-oxide. | 8-methyl-4-(p-propoxyphenyl)-2-quinazolinepropionitrile. |
| 5-(o-bromophenyl)-7-iodo-1-imino-1,2,3,3a-tetrahydropyrrolo(1,2),3,3a-tetrahydropyrrolo(1,2-a)quinazoline 4-oxide. | 4-(o-bromophenyl)-6-iodo-2-quinazolinepropionitrile. |
| 8-ethoxy-1-imino-5-phenyl-1,2,3,3a-tetrahydropyrrolo(1,2-a)quinazoline 4-oxide. | 7-ethoxy-4-phenyl-2-quinazolinepropionitrile. |
| 5-(m-fluorophenyl)-1-imino-1,2,3,3a-tetrahydropyrrolo(1,2-a)quinazoline 4-oxide. | 4-(m-fluorophenyl)-2-quinazolinepropionitrile. |
| 1-imino-5-phenyl-7-propyl-1,2,3,3a-tetrahydropyrrolo(1,2-a)quinazoline 4-oxide. | 4-phenyl-6-propyl-2-quinazolinepropionitrile. |
| 7-butoxy-5-(p-butoxyphenyl)-1-imino-1,2,3,3a-tetrahydropyrrolo(1,2-a)quinazoline 4-oxide. | 6-butoxy-4-(p-butoxyphenyl)-2-quinazolinepropionitrile. |
| 5-(m-ethoxyphenyl)-1-imino-1,2,3,3a-tetrahydropyrrolo(1,2-a)quinazoline 4-oxide. | 4-(m-ethoxyphenyl)-2-quinazolinepropionitrile. |
| 5-(p-ethylphenyl)-1-imino-1,2,3,3a-tetrahydropyrrolo(1,2-a)quinazoline 4-oxide. | 4-(p-ethylphenyl)-2-quinazolinepropionitrile. |

EXAMPLE VII

A mixture of 1.6 g. of 7-chloro-1-imino-5-phenyl-1,2,3,3a-tetrahydropyrrolo(1,2-a)quinazoline 4-oxide is heated in 1 N hydrochloric acid for five hours, cooled and 0.55 g. of product collected. Recrystallization from ethanol and then isopropanol affords 7-chloro-3,3a-dihydro-5-phenylpyrrolo[1,2-a]quinazolin - 1(2H)-one 4-oxide, M.P. 223–225° C.

*Analysis.*—Calcd. for $C_{17}H_{13}ClN_2O_2$ (percent): C, 65.29; H, 4.19; Cl, 11.34; N, 8.96. Found (percent): C, 65.34; H, 4.26; Cl, 11.15; N, 9.35.

In a similar manner, the 5-aryl-1-imino-1,2,3,3a-tetrahydropyrrolo(1,2-a)quinazoline 4-oxides described in Examples I–VI are readily converted to their corresponding 5-aryl - 3,3a - dihydropyrrolo[1,2-a]quinazolin-1(2H)-one 4-oxides.

What is claimed is:
1. A compound selected from the group consisting of those having the formula:

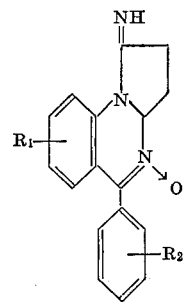

wherein $R_1$ and $R_2$ are both selected from the group consisting of hydrogen, halogen, lower alkyl and lower alkoxy.

2. A compound as described in claim 1 which is: 7-chloro-1-imino-5-phenyl - 1,2,3,3a - tetrahydropyrrolo-(1,2-a)quinazoline 4-oxide.

3. A compound as described in claim 1 which is: 1-imino - 7 - methyl-5-phenyl-1,2,3,3a-tetrahydropyrrolo-1,2-a)quinazoline 4-oxide.

4. A compound as described in claim 1 which is: 1-imino - 5 - phenyl - 1,2,3,3a-tetrahydropyrrolo(1,2-a) quinazoline 4-oxide.

5. A compound as described in claim 1 which is: 5-(p-chlorophenyl) - 1 - imino-7-methoxy-1,2,3,3a-tetrahydropyrrolo(1,2-a)quinazoline 4-oxide.

6. A compound as described in claim 1 which is: 7 - chloro - 1-imino-5-(p-tolyl)-1,2,3,3a-tetrahydropyrrolo (1,2-a)quinazoline 4-oxide.

7. A process for the preparation of compounds having the formula:

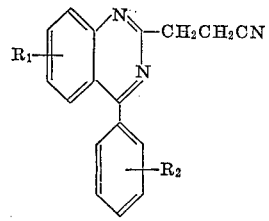

wherein $R_1$ and $R_2$ are both selected from the group consisting of hydrogen, halogen, lower alkyl and lower alkoxy which comprises:
  (a) the cyclization of a 4-aryl-1,2-dihydro-2-quinazolinepropionitrile 3-oxide of the formula:

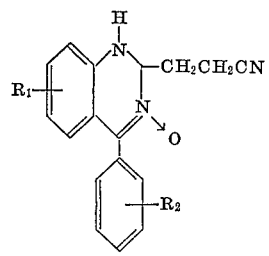

wherein $R_1$ and $R_2$ are defined as above, by contact with an alkali metal hydroxide in a water miscible, reaction-inert organic solvent for a period of about twelve to about seventy-two hours to afford a 5-aryl- 1 - imino - 1,2,3,3a - tetrahydropyrrolo(1,2 - a)quinazoline 4-oxide of the formula:

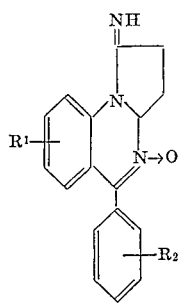

wherein $R_1$ and $R_2$ are defined as above, and
(b) the rearrangement of the above prepared 5-aryl-1-imino - 1,2,3,3a-tetrahydropyrrolo(1,2-a)quinazoline 4-oxide by contact with a carboxylic acid anhydride at a temperature range from about 50° C. to about 120° C. for a period of about five minutes to about a half hour.

8. A process as described in claim 7 where the alkali metal hydroxide is sodium hydroxide; the water miscible, reaction-inert organic solvent is ethanol; and the carboxylic acid anhydride is acetic anhydride.

9. A process as described in claim 7 wherein the rearrangement reaction is conducted with a mixture of a carboxylic acid anhydride and a carboxylic acid.

10. A process as described in claim 7 wherein the mixture of a carboxylic acid anhydride and a carboxylic acid comprises acetic anhydride and acetic acid.

References Cited
UNITED STATES PATENTS

| | | | |
|---|---|---|---|
| 3,268,529 | 8/1966 | Bolgor | 260—251 |
| 3,459,754 | 8/1969 | Bell | 260—256.4 |

ALEX MAZEL, Primary Examiner

R. J. GALLAGHER, Assistant Examiner

U.S. Cl. X.R.

260—256.4